United States Patent
Lvovskiy et al.

(10) Patent No.: US 10,573,271 B1
(45) Date of Patent: Feb. 25, 2020

(54) DISPLAY SYSTEM FOR MOTORCYCLISTS

(71) Applicants: Matvey Lvovskiy, New York, NY (US); Aleksandr Efros, Sankt-Peterburg (RU); Artem Goldmann, Saarbruecken (DE)

(72) Inventors: Matvey Lvovskiy, New York, NY (US); Aleksandr Efros, Sankt-Peterburg (RU); Artem Goldmann, Saarbruecken (DE)

(73) Assignee: EDS HOLDING GMBH (DE)

( * ) Notice: Subject to any disclaimer, the term of this patent is extended or adjusted under 35 U.S.C. 154(b) by 0 days.

(21) Appl. No.: 16/270,816

(22) Filed: Feb. 8, 2019

(51) Int. Cl.
| | | |
|---|---|---|
| *G09G 5/00* | (2006.01) | |
| *H04N 7/18* | (2006.01) | |
| *G06F 3/147* | (2006.01) | |
| *G09G 5/10* | (2006.01) | |
| *G02B 27/01* | (2006.01) | |
| *A42B 3/04* | (2006.01) | |
| *A42B 3/22* | (2006.01) | |

(52) U.S. Cl.
CPC ........... *G09G 5/005* (2013.01); *A42B 3/0426* (2013.01); *A42B 3/22* (2013.01); *G02B 27/0172* (2013.01); *G02B 27/0176* (2013.01); *G06F 3/147* (2013.01); *G09G 5/10* (2013.01); *H04N 7/185* (2013.01); *G02B 2027/0138* (2013.01); *G02B 2027/0152* (2013.01); *G09G 2320/0626* (2013.01); *G09G 2380/10* (2013.01)

(58) Field of Classification Search
CPC .. G09G 5/005; G09G 5/10; G09G 2320/0626; G09G 2380/10; A42B 3/0426; A42B 3/22; G02B 27/0172; G02B 27/0176; G02B 2027/0138; G02B 2027/0152; G06F 3/147; H04N 7/185
See application file for complete search history.

(56) References Cited

U.S. PATENT DOCUMENTS

| | | | |
|---|---|---|---|
| 5,771,497 A | 6/1998 | Steele | |
| 7,982,959 B1 * | 7/2011 | Lvovskiy | ............... G02B 27/01 348/115 |
| 9,414,634 B2 | 8/2016 | Gindin | |

(Continued)

FOREIGN PATENT DOCUMENTS

KR       20090011449 A  *  2/2009

*Primary Examiner* — Maria E Vazquez Colon
(74) *Attorney, Agent, or Firm* — Yefim Kreydin

(57) ABSTRACT

The proposed display system providing in the motorcyclist's field of view all visual information needed for driving and maneuvering in form of the image projected into optical infinity in direction of the motorcycle travel so to watch the traffic situation the motorcyclist does not need to turn his head to the rear view mirrors with temporary interruption of eye contact with the road because of necessity of the visual apparatus readjusting, is realized by use of located in the motorcyclist's helmet the autonomous optoelectronic system including the display module with the programmable control unit forming in the motorcyclist's field of view the collimated image of sensors readings in the form of numbers and scales and also a TV image of rear hemisphere and the real-time picture according to GPS data: the connection between the equipment placed in the helmet and the motorcycle movement sensors. TV camera and GPS receiver is carried out using the Wi-Fi technology.

6 Claims, 3 Drawing Sheets

(56) References Cited

U.S. PATENT DOCUMENTS

| 10,061,992 B2* | 8/2018 | Gondo | G02B 27/017 |
| 1,009,840 A1 | 10/2018 | Weller | |
| 2008/0239080 A1* | 10/2008 | Moscato | A42B 3/0426 |
| | | | 348/148 |
| 2016/0037849 A1* | 2/2016 | Shearman | A42B 3/0426 |
| | | | 2/424 |

* cited by examiner

DISPLAY SYSTEM FOR MOTORCYCLISTS

BACKGROUND OF THE INVENTION

Proposed display system is designed to display full required volume of visual information in form of collimated, i.e., projected into optical infinity, image in the field of view of the motorcyclist or driver of another vehicle in direction of moving while driving and maneuvering. Due to this the driver does not need to turn his head when using side rear-view mirrors or monitoring sensors located on the motorcycle steering wheel and therefore losing visual control of the road. Even a short-term loss of visual control of the road is risky for the driver. The readjusting, of visual apparatus when changing direction of sight from the road to the rear-view mirrors or sensors located on the steering wheel is also potential security risk for driving. In both cases visual adaptation and accommodation are changing and as it takes some time even experienced driver may be mistaken in assessing the actual traffic situation during this time.

Currently there are motorcycle helmets equipped with various optoelectronic devices that provide the driver with additional visual information when driving. Described in the U.S. Pat. No. 5,771,497 patent the motorcycle helmet has following distinctive features:
"1. A helmet comprising an outer protective shell, a channel through the helmet inside the shell, and a one piece mounting adjacent the roof of the channel mounted to, the inside of the shell, the mounting carrying or comprising at least one mirror facing from the mounting into the channel, the mirror or mirrors enabling a person wearing the helmet to see through the channel, and sideways locating means between the shell and the mounting, including a rib on one of the shell and the mounting and means defining a groove to receive the rib on the other of the shell and the mounting", see col. 6, lines 35-45 of the patent description.
The helmet by U.S. Pat. No. 9,414,634B2 patent has another distinctive features:
"1. A helmet comprising a head shield;
a video camera coupled with the helmet shield and configured to generate video data from a scene substantially not in the field of view of a wearer of the helmet;
a mounting base configured to act as gyroscopic base and couple the video camera as a whole unit with the helmet and further configured to automatically, without user input, maintain a desired fixed direction of the video camera with respect to ground independent of an orientation or change of orientation of the helmet with respect to the ground; and a display device directly coupled with the video camera and configured to display the video data", see col. 5, lines 27-41 description of the patent.
Despite the originality of proposed in the above U.S. Pat. Nos. 5,771,497 and 9,414,634 patents technical solutions both of them have significant drawback: to watch a rear hemisphere picture the motorcyclist has to look at the upper part of the helmet and since at this time he loses visual contact with the road and his visual apparatus is being reconfigured the dangerous consequences are possible.
The technical solution by U.S. Pat. No. 10,098,401 patent is the most close to the proposed in present Application for patent technical solution by the structure and parameters. According to the description of the U.S. Pat. No. 10,098, 401, see col. 1, lines 65-67; col. 2, lines 1-5, the proposed helmet has following distinctive features:
"The present invention comprises a helmet having a battery-operated augmented reality display. According to an illustrative embodiment, the helmet comprises a Hill-face motorcycle helmet with a look-down micro-display that projects a virtual image in-line with the helmet's chin bar (which is space that is already obstructed from the motorcyclist's field of view".
The main disadvantage of this technical solution is that the image of visual information picture has small angular dimensions caused by small linear dimensions of the display that should fit in a confined space between the motorcyclist's chin and the helmet's chin bar. Another significant drawback is that the visual information picture is located below the external viewing area in the direction of travel seen by the motorcyclist through the transparent visor. In this case the motorcyclist is unable to view formed by the display visual information image against the external space background in real-time mode and he has to change his sight direction every time from external space picture to the visual information image and vice versa, as a result, temporary losing visual road controlling that seriously complicates driving and adversely affects safety when increasing the motorcycle speed.
Also it is important to note the following statement given in the U.S. Pat. No. 10,098,401 patent see col. 6, lines 39-43: "For example, although in the illustrative embodiment display device 24 is not a heads-up-display, use of a heads-up-display with combination with the other features of the present invention is considered within the scope of the invention"
This is a groundless statement since in this invention there is no main fundamental advantage of HUD: providing the capability to view ambient space picture and collimated into optical infinity image of visual information parametric data which are combined in a single angular field of view simultaneously.
Another feature of the helmet by U.S. Pat. No. 10,098,401, see col. 7, lines 1-10:
"a gyroscope disposed within said cavity, wherein said gyroscope is adapted to generate a first signal;
a rear-view camera adapted to generate a second signal, the rear-view camera being disposed within said cavity on a pivot, said pivot adapted to move in response to said first signal such that said rear-view camera can be gyroscopically stabilized;
a display disposed within said inner shell, wherein said display is adapted to (i) receive said second signal and (ii) convert said second signal into an image".
The drawback of such technical solution is inevitable lag of video image of the helmet rear hemisphere in relation to the real road situation picture caused by inertia parameters of the mechanical device that fulfills the turns of the video camera when the motorcyclist turns his head quickly.

The purpose of present Application is to eliminate above-stated disadvantages of known technical solutions by use of a proposed Helmet-mounted display system for motorcycle drivers consisting of three components: the helmet containing the HUD-type equipment which is adapted for peculiarities of the motorcycle driving, digital wi-fi signals generator and rear hemisphere view system such as TV-camera. The last two components are fixed on the motorcycle body. The equipment located in the motorcyclist helmet provides all required visual information including the rear hemisphere image, generated by use of wide-angle rear view TV-camera, and data of sensors of speed, engine speed, remaining fuel, GPS system, etc., in the form of luminous collimated image of information picture, generated within the wide angular field of view against the background of ambient road situation picture in the direction of traffic. Implementation of this technical solution provides the motorcyclist with capability for driving, including maneuvering when overtaking and changing lanes, without losing the visual road contacting and readjustment of visual apparatus necessity that provides a significant increase in driving safety.

SUMMARY OF THE INVENTION

The display system of HUD-type is installed in the helmet and consists of two components: a display module and a collimating optical system. The display module contains an electronic signal generator and a light emitting micro display, on a screen of which primary image of combined information picture of a certain brightness is formed. The collimating optical system, projecting the luminous image of the combined information picture into optical infinity, includes a semitransparent helmet visor on the inner surface of which a beam-splitting coating is applied and a projection lens, located between, the micro display screen and the semitransparent helmet visor. As a result the motorcyclist is able to see via semitransparent visor the collimated image of the information picture against the outer situation picture background without the need for re-accommodation and re-adaptation.

The use of the HUD in the proposed system was largely promoted by the fact that the authors of present Application for patent have extensive experience in development and introduction into mass production of HUD-type devices used in flight vehicles and ground transport. This is confirmed by the following patents: U.S. Pat. No. 7,629,877B2, U.S. Pat. No. 8,305,295B2, U.S. Pat. No. 8,786,846B2, U.S. Pat. No. 8,982,472B2, U.S. Pat. No. 9,281,821B, It, should be noted that the HUD-type device designed for the motorcycle has significant differences from the above-mentioned devices at least because it must be placed in the helmet. In this case it is necessary to solve several new rather complex technical problems.

The display module is provided with a control unit, which is a microprocessor, supplemented by the elements of ROM and RAM memory and switching. When generating signals, including TV frame and linear scanning, to form the required optical image within the motorcyclist's field of view, order and sequence of operations are provided by a relevant program.

Besides the image of the motorcycle moving parameters in symbolic form, located, mostly, in peripheral areas of field of view, the display system provides in specified area of this field of view the TV image from the rear view camera, included into the system, which is switched by the driver at the moment before he takes a decision to start maneuvering, e.g., at overtaking. Thus, in order to get information about the presence or absence of obstacle there is no need to turn the head at a rather large angle and readjust the visual apparatus. To activate the display system operating mode it is necessary to push a button, located on the steering wheel, and simultaneously the rear view TV camera is being activated and the display module and the whole display system are being switched into combined operating mode. The proposed combined mode allows to sequentially reproduce TV raster during the time within the duration of one frame of standard. TV scanning, and to carry out the image plotting of the symbolic information by the functional method during the time of "reverse of the beam". Due to low speed this method of image plotting allows to provide the brightness of symbols which is significantly higher than the brightness of external background under sunlight and that is important for improvement of symbols observability against the external background. It should be noted that the frame rate generator is also a regeneration frequency generator while image plotting of the symbols. Due to this, TV frames formation and image plotting of symbols are fully synchronized.

Since the proposed system is based on digital methods of input, processing and displaying of information of various types there are no any technical or technological restrictions of number of displayed parameters and their location within the display system field of view. The choice depends on the results of engineering and psychological studies, taking into account ergonomics and testing on simulators. Nevertheless several parameters have to be displayed: speed, engine speed, fuel volume, roll angle—real-time motorcycle lateral angle of inclination relative to its longitudinal axis—with indication of limit values of this angles, with which the motorcycle may tip over at sharp turn when moving at a given speed. Therefore, the digital sensors of listed parameters have to be provided, the output data from which are entered to a digital generator of wi-fi signals by USB serial interface. Wireless link between the electronic apparatus, located in the helmet, and the symbols generator is carried out by use of wi-fi technology The rear view is provided by TV camera. A terrain and road traffic situation picture is captured by the camera in TV standard and reproduced together with the symbolic information picture within the display system field of view in real-time mode. The TV camera is installed on a strong telescopic bar, fixed in the rear part of the motorcycle behind the passenger seat. The TV camera is provided with wide-angle optics, which allows to see several lanes on both sides of a multi-lane highway. In principle, the wider the viewing angle the more higher safety is provided when changing lanes or overtaking. Proposed and briefly described helmet-mounted display system for motorcycle allows to improve the driving and maneuvering safety under any road-traffic situation by integrating all required information within the frontal field of view and due to this there is no need for the driver to turn his head and neither re-adaptation nor re-accommodation of visual apparatus are not required.

DETAILED DESCRIPTION OF PREFERRED EMBODIMENT OF THE INVENTION

Figure 1:
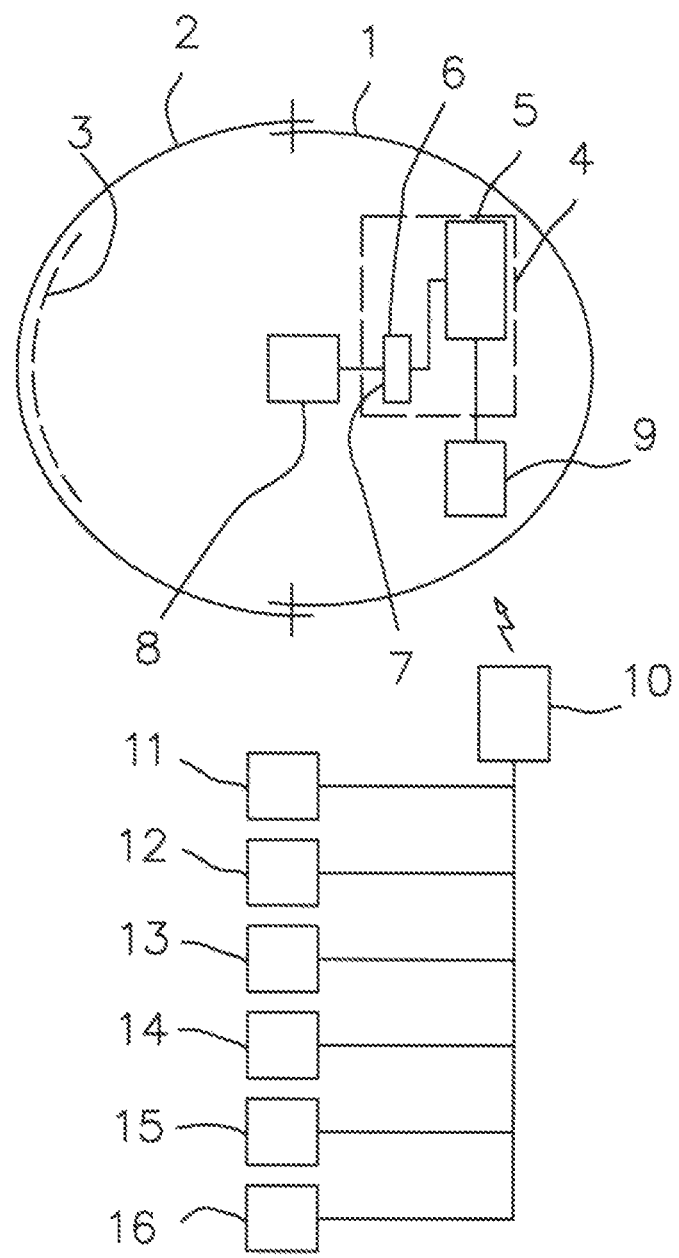
FIG. 1 Functional scheme of the system.

FIG. 1 shows the functional scheme of the proposed display system the helmet 1 in which the protective visor 2, carried out of durable organic glass, e.g., polycarbonate, has a special beam-splitting coating 3 on an inside surface. The display module 4, located in the helmet, includes a microprocessor 5 and light-emitting micro-display 6, e.g., OLED, generating the primary image of information picture of specified brightness on the screen 7. Located between the screen 7 and beam-spitting coating 3 of the visor 2 the projection lens 8 forms by use of the visor 2 a collimated image, which is viewed by the driver against the outer situation picture background without re-adaptation and re-accommodation necessity. Power supply of the display module 4 is provided by a rechargeable accumulator 9, located in the helmet. Remote connection of the display module 4 with the sensors of input signals is provided by use of digital generator of wi-fi signals 10, located on the motorcycle. Power supply of the generator 10 is provided by the accumulator 9 of the motorcycle. The sensors of the displayed information parameters are connected to the wi-fi signal generator 10 via serial interface USB, For example, such sensors can be listed below:

rear view TV camera video-signal 11,
speedometer 12,
engine speed sensor 13,
fuel sensor 14,
real-time roll angle sensor 15
GPS receiver 16.

The list of parameters can be changed or supplemented by displaying graphical symbolic information such as text, signaling, warning, reference, etc. All the above data is entered into the processor 5 program in advance, taking into account type and location within the display system field of view. It should be noted that a number of sensors can be placed and integrated in the wi-fi signal generator 10.

Figure 2:
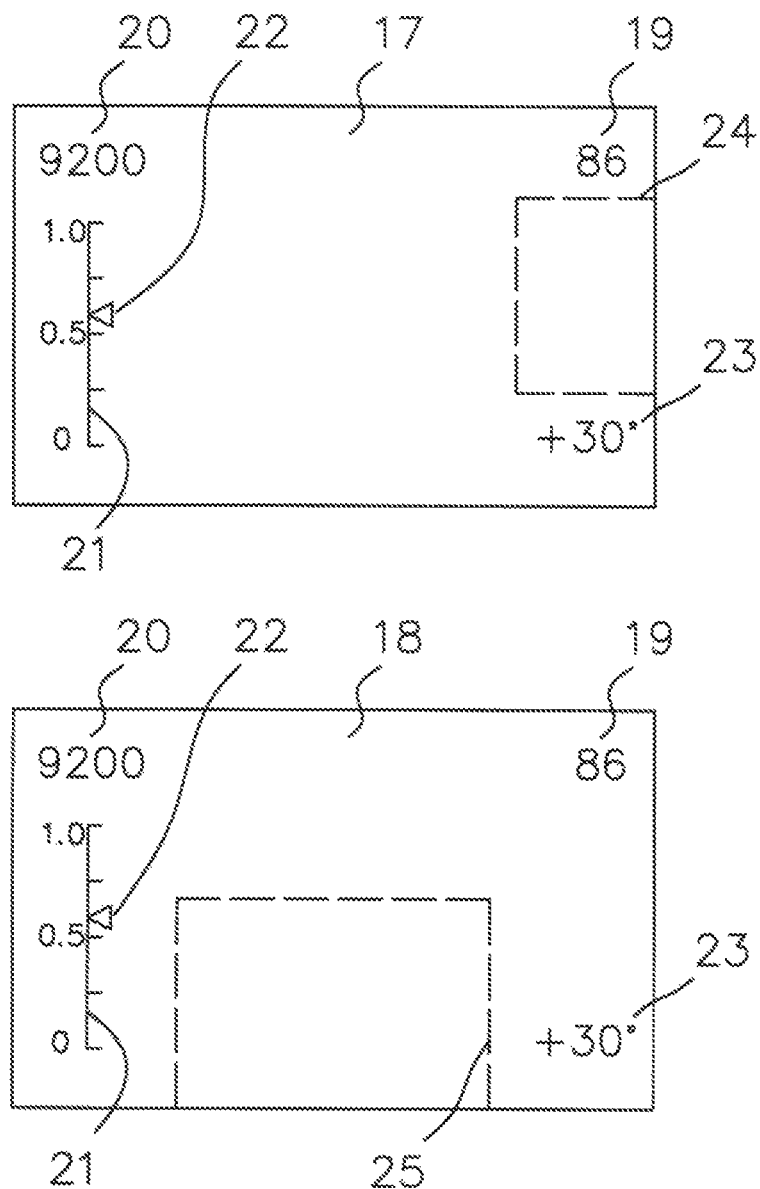
FIG. 2 Information pictures at switched on and switched out rear view TV camera.

FIG. 2 shows the information pictures within the angular field of view of the display system, viewed by the driver at switched out 17 and switched on 18 rear view TV camera. In both cases location of the indicators of the above sensors 11-16 is the same. At the same time the speed 19 and engine speed 20 indicators are depicted as numbers and located, in upper peripheral parts of the angular field of view. In this case they occupy a minimal part of the field of view and do not obscure the central area. It is preferable to locate the fuel indicator under the engine speed indicator in the left part of the field of view. It can be carried out in the form of linear digitalized scalene 21 with a moving index 22, indicating the level of fuel in the tank of the motorcycle. The indicator of roll angle 23 can be represented by numerical value and a sign of the roll angle in the right lower part of the field of view and the GPS data 24 is located between the indicators of roll angle 23 and speed 19, When the TV camera is being switched on the rear view TV image 25 is appeared in the lower part of the field of view, as shown in the variant 18, and the GPS data indication 24 is temporary switched off. It should be noted that if there is an angle of roll 23 in real-time, then the TV image in the field of view of HUD is turned by use of the software at the same angle so that the driver perceives the rear view without the roll relative to the road in the direction of the motorcycle.

Figure 3:
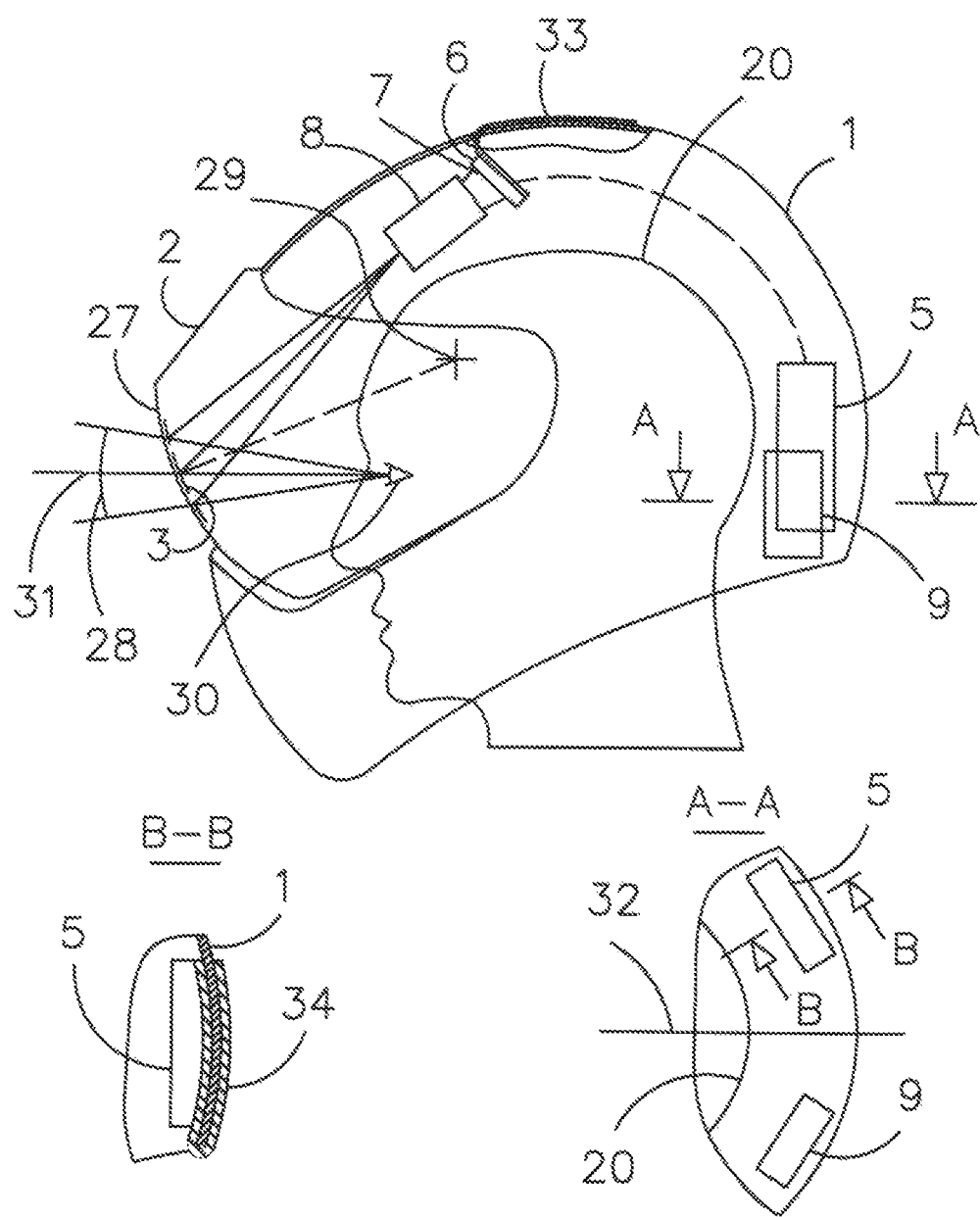
FIG. 3 Layout scheme of the helmet with the elements of the display system

FIG. 3 shows the helmet layout scheme embodiment with the elements of the display system. The micro display 6 and the projection lens 8 are located in the upper part of the helmet 1 over the driver's head 26. The control unit 5 and the accumulator 9 are located in the back of the helmet. The protective visor 2, carried out of polycarbonate, is provided with a curved section 27, optical characteristics of which, such as shape and surface cleanliness, are high enough. Beam-splitting coating 3 is applied on the inner surface of the section 27, The reflection coefficient of the beam-splitting coating 0.35-0.45 is enough to provide the possibility of comfortable observation of the external situation picture and the collimated image of the information picture against its background within the angular field of view 28 of the display system.

The motorcycle display system operates as follows: the current data from the respective sensors 11-16 enter the control unit 5 by the wi-fi channel. In accordance with the program the graphical symbolic information image is represented during the time of "revers of the beam", which is equal to several milliseconds depending on the selected TV standard, the signals, generated by the control unit 5, enter the micro display 6, which forms on the screen 7 the corresponding primary image of the information picture of required brightness. Since the volume of graphical symbolic information from the sensors 9-12 is small the image plotting can be carried out by functional method, allowing to reduce the speed of image plotting and to get higher brightness of symbols image due to this. This is especially important because the brightness of the symbolic images of this parameters should provide a confident perception under any ambient light conditions. The luminous image, formed on the screen 7 by use of the projection lens 8 and the beam-splitting coating 3 of the protective visor 2, is projected into optical infinity in the direction of the motorcycle movement and it is viewed by the driver within the angular field of view of the display system, against, the outer situation picture without re-adaptation and re-accommodation of the visual apparatus.

In order to provide optimal placement of elements of the display system in the helmet the collimating optical system, shown at FIG. 3, is designed in such a way that geometric center of curvature 29 of the area 27 is located in vertical plane of symmetry of the helmet between the driver's eyes 30 and the projection lens 8. With such layout the collimating optical system forms the image with significant geometric distortions, caused by the shape and slope of the area 27 of the protective visor of the helmet with the beam-splitting coating 3 relative to an axis 31 of the driver's eyes 30. Given this, the primary luminous image of the information picture is formed on the screen 7 of the light emitting display 6 by the control unit 5 with the specially calculated geometric distortions, which are equal in absolute value but opposite sign to the distortions, inserted by the collimating optical system, thus compensating them. Due to availability of such electronic correction system the driver perceives the collimated image of the information picture without the discernible distortions.

The electronic control unit 5 and the accumulator 9 are the most bulky elements of the helmet-mounted display system. To improve a balancing of the helmet this elements are installed at the lower rear part of the helmet left and right relative to the helmet plane of symmetry 32 as it is shown at FIG. 3, section A-A. Since the electronic unit 5 and the microprocessor 6 are heated while operating, they are provided with the radiators, which have cooled surfaces 33, 34, carried out of pure aluminum with the best thermal conductivity per unit of mass. The cooled surface 33 of the radiator 33, attached to the micro display 6, is placed on the upper outer area of the helmet and fixed by screws or glue. The cooled surface 34 of the radiator 34, attached to the electronic control unit 5, is placed on the rear outer area of the helmet, as shown on FIG. 3, section B-B, and also fixed by screws or glue. The radiators 33 and 34 collect the heat from the micro display 6 and the control unit 5 and disperse it into the surrounding atmosphere by blowing the helmet with an air stream when the motorcycle is moving. It should be noted that the application of certain types of chips, e.g., 14 nm Intel chip as a processor 13, significantly reduces heat dissipation. The use of 7 nm chips, planned for release, will further reduce heat dissipation. The accumulator 9 is easily removable, all moving it to be recharged outside the helmet or easily replaced with a spare fully charged accumulator in case of its failure along the way.

Advantages of the Invention

Ensuring safe motorcycle riding is still a relevant problem currently. Accordingly, there is a need to search and develop new technical and technological solutions. Growing popularity of high-speed motorcycles of medium and high power and soaring traffic cause an increase in crash rates among the motorcyclists. Another reason is the lack of awareness of the motorcyclist in a changing real traffic situation, especially when maneuvering. In this case a dangerous situation occurs because visual contact with the road is interrupted. The same situation occurs when the motorcyclist looks at the speedometer or the fuel sensor, which are located on the steering wheel. Since the proposed display system provide the motorcyclist with more complete information about the current real traffic situation he does not need to turn his head towards the side rear-view mirrors or change a look direction from the road to the speedometer or fuel sensor, etc. Moreover, in such cases there is no problem of re-accommodation and re-adaptation of the motorcyclist's visual apparatus. Thus, the application of the proposed display system helps to improve driving safety and reduce accidents involving motorcyclists.

Since any additional components introduced into the helmet design result in an increase in weight and size, which creates inconvenience in operation and also increases production costs, the optimal structural scheme is selected for the proposed helmet implementation. Unlike the helmet by U.S. Ser. No. 10/098,401B2 patent the proposed helmet design does not include:

rear view TV camera with fastening elements and device for attitude control;

air turbine and located in the helmet upper part special air channel, containing turbo-generator, intended to recharge the accumulator battery, which is switchable to turbofan mode if the battery and driver's head need to be, cooled in hot weather;

signaling elements located on the helmet body because the required signaling information is displayed directly in front of the driver.

Thus, all of above features are not present in the proposed helmet design. As stated above, according to the authors of the U.S. Ser. No. 10/098,401B2 patent the helmet they developed is not a HUD while the proposed helmet design is based exactly on principles of construction of HUD.

The heat emitting devices located in the helmet is cooled by use of radiators that practically fit within the contour of the helmet. In nearest future due to the transition to a higher-level 7 nm chip integration technology the power consumption and heat emission will decrease significantly and that will improve thermal conditions inside the helmet. Continuous recharging of the accumulator can be carried out from the motorcycle power supply by wi-fi line as the weight and size of the charger component, located in the helmet, will decrease.

The TV camera is applied in the proposed system to provide the observation of the rear hemisphere as the most affordable component of a wide range of applications. At the same time in some cases special purpose motorcycles must be equipped with a night vision system. Therefore, it is necessary to use a low-level TV system instead of conventional camera or use the night vision system in addition to the TV camera.

The proposed display system can be used not only for two-wheeled motorized vehicles but also for other types of vehicles.

What is claimed is:

1. An operating method of a display system for motorcyclists, said system comprising a helmet with a built-in display module and a light-emitting micro display, a protective visor with a special beam-splitting coating on inside surface, the method comprising steps of:

formatting a primary image of an information picture by the micro display, represented on a micro display screen in graphical and symbolic form, and projecting said primary image of the information picture into optical infinity on the beam-splitting coating of the protective visor in direction of a motorcycle travel and being viewable for the motorcyclist within an angular field of view of the display system against an another situation picture background wherein an image of information picture is formed on the screen of the light-emitting micro display with specially calculated geometric distortions, which are equal in absolute value and opposite in sign to distortions introduced by a collimating optical system, to compensate for an optical distortion of a collimated image of the information picture caused by a shape and inclination of the inside surface of the helmet protective visor with the beam-splitting coating applied.

2. The operating method of the display system by claim 1 where all information required to drive the motorcycle is supplemented by an image of a rear hemisphere from a TV camera, video signal from which enters an input of a digital generator of wi-fi signals.

3. The operating method of the display system of claim 1 wherein the primary image of the information picture of graphical symbolic information is formed by functional method with reduced speed during a time of reverse of a beam of a frame scanning to improve a brightness of a symbolic information image containing parameters required for driving and also some graphical and symbolic elements.

4. The operating method of the display system of claim 1 wherein a formed luminous image is projected into optical infinity in direction of the motorcycle travel and is viewable for the motorcyclist within the angular field of view of the display system against an outer situation picture background without re-accommodation and re-adaptation of visual apparatus.

5. A operating method of a display system for motorcyclists said system comprising a helmet with a built-in display module, a light-emitting micro display, projection lens and a protective visor with special beam-splitting coating on an inner surface, comprising steps of:

formatting of primary image of an information picture by the light-emitting micro display and representing said image on a micro display screen in symbols form;

projecting said primary image into optical infinity by use of the projection lens and beam-splitting coating of the protective visor in direction of a motorcycle travel in a field of view of the motorcyclist within an angular field of view of the display system against an outer situation picture background, wherein on the step of formation of the primary image the primary image of the information picture is formed on a screen of the light-emitting micro display with specially calculated geometric distortions, which are equal in absolute value and opposite in sign to distortions, caused by a shape and inclination of the inner surface of the protective visor with the beam-splitting coating applied, in order to compensate optical distortions of a collimated image of the information picture.

6. A display system for motorcyclists comprising:

a helmet, a collimating optical system comprising projection lens and a visor with beam-splitting coating, applied on a protective visor inner surface wherein the surface of the visor is made curvilinear with center of curvature located in vertical symmetry plane of the visor between the projection lens and eyes of the motorcyclist, a display module, located in the helmet, comprising an electronic control unit-microprocessor and a light-emitting micro display on a screen of which a primary image is formed with calculated geometric distortions which are equal in absolute value and opposite in sign to optical distortions introduced by the collimating optical system, providing compensation of said optical distortions.

* * * * *

UNITED STATES PATENT AND TRADEMARK OFFICE
CERTIFICATE OF CORRECTION

PATENT NO. : 10,573,271 B1
APPLICATION NO. : 16/270816
DATED : February 25, 2020
INVENTOR(S) : Matvey Lvovskiy, Aleksandr Efros and Artem Goldmann It is certified that error appears in the above-identified patent and that said Letters Patent is hereby corrected as shown below:

On the Title Page

(73) Assignee: EDS HOLDING GMBH (DE) should read: EOS HOLDING GMBH (DE)

Signed and Sealed this
Fourteenth Day of April, 2020

Andrei Iancu
*Director of the United States Patent and Trademark Office*